(12) United States Patent  
Kandagadla et al.

(10) Patent No.: US 11,540,086 B2  
(45) Date of Patent: Dec. 27, 2022

(54) ROUND TRIP TIME USING ORTHOGONAL FREQUENCY-DIVISION MULTIPLE ACCESS PROCEDURE

(71) Applicant: QUALCOMM Incorporated, San Diego, CA (US)

(72) Inventors: Manohar Kandagadla, San Diego, CA (US); Srinivas Chowdavarapu, Hyderabad (IN); Krishna Chaithanya Paluru, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 17/191,302

(22) Filed: Mar. 3, 2021

(65) Prior Publication Data

US 2022/0286806 A1     Sep. 8, 2022

(51) Int. Cl.
| | |
|---|---|
| *H04W 24/00* | (2009.01) |
| *H04W 4/02* | (2018.01) |
| *H04L 5/00* | (2006.01) |
| *H04W 4/029* | (2018.01) |
| *H04W 72/04* | (2009.01) |
| *H04W 4/20* | (2018.01) |

(52) U.S. Cl.
CPC .......... *H04W 4/023* (2013.01); *H04L 5/0055* (2013.01); *H04W 4/029* (2018.02); *H04W 72/048* (2013.01); *H04W 4/20* (2013.01)

(58) Field of Classification Search
CPC ... H04W 4/023; H04W 4/029; H04W 72/048; H04W 4/20; H04L 5/0055
See application file for complete search history.

(56) References Cited

U.S. PATENT DOCUMENTS

2018/0041990 A1\* 2/2018 Venkatesan .......... H04B 7/0452

FOREIGN PATENT DOCUMENTS

WO    WO-2018194723 A1 \* 10/2018

\* cited by examiner

*Primary Examiner* — Erika A Washington  
(74) *Attorney, Agent, or Firm* — Sunstein LLP

(57) ABSTRACT

Techniques are provided for obtaining round trip timing (RTT) measurements using orthogonal frequency-division multiple access procedures. An example method for determining distances to a plurality of stations includes receiving a respective first measurement frame from each of the plurality of stations, wherein the first measurement frame from each of the plurality of stations is transmitted simultaneously, transmitting a single multi-station block acknowledgment frame to the plurality of stations, receiving a respective second measurement frame from each of the plurality of stations, wherein the second measurement frame from each of the plurality of stations is transmitted simultaneously, and determining a respective distance to each of the plurality of stations based at least in part on the first measurement frame and the second measurement frame from at least some of the plurality of stations.

20 Claims, 9 Drawing Sheets

ROUND TRIP TIME USING ORTHOGONAL FREQUENCY-DIVISION MULTIPLE ACCESS PROCEDURE

BACKGROUND

A wireless local area network (WLAN) may be formed by one or more access points (APs) that provide a shared wireless medium for use by a number of client devices. Each AP, which may correspond to a Basic Service Set (BSS), periodically broadcasts beacon frames to enable compatible client devices within wireless range of the AP to establish and maintain a communication link with the WLAN. WLANs that operate in accordance with the IEEE 802.11 family of standards are commonly referred to as Wi-Fi networks, and client devices that communicate with the AP in a Wi-Fi network may be referred to as wireless stations (STAs).

Obtaining the locations of stations that are accessing a WLAN may be useful for many applications including, for example, personal navigation, asset tracking, locating a friend or family member, etc. Existing positioning methods include methods based on measuring radio signals transmitted from a variety of devices or entities including satellite vehicles (SVs) and terrestrial radio sources in a WLAN such as access points and other stations. For example, round trip time (RTT) procedures may be used to estimate a range between two devices.

SUMMARY

An example method for determining distances to a plurality of stations according to the disclosure includes receiving a respective first measurement frame from each of the plurality of stations, wherein the first measurement frame from each of the plurality of stations is transmitted simultaneously, transmitting a single multi-station block acknowledgment frame to the plurality of stations, receiving a respective second measurement frame from each of the plurality of stations, wherein the second measurement frame from each of the plurality of stations is transmitted simultaneously, and determining a respective distance to each of the plurality of stations based at least in part on the first measurement frame and the second measurement frame from at least some of the plurality of stations.

Implementations of such a method may include one or more of the following features. The first measurement frame and the second measurement frame may be fine timing measurement frames. The first measurement frame and the second measurement frame may be encoded with an orthogonal frequency-division multiple access procedure. The single multi-station block acknowledgment frame may include a plurality of receiver addresses associated with the plurality of stations. A single measurement request message may be transmitted to the plurality of stations prior to receiving the first measurement frame. The single measurement request message may include an indication of a resource unit for each of the plurality of stations to transmit the first measurement frame. The single measurement request message may include an indication of a capability of an initiating station to receive measurement frames from the plurality of stations based on an orthogonal frequency-division multiple access procedure. The plurality of stations may include at least one user equipment. The plurality of stations may include at least one access point. The first measurement frame, the single multi-station block acknowledgment frame, and the second measurement frame utilize a sidelink wireless communication protocol.

An example apparatus according to the disclosure includes a memory, at least one transceiver, at least one processor communicatively coupled to the memory and the at least one transceiver and configured to receive a respective first measurement frame from each of a plurality of stations, wherein the first measurement frame from each of the plurality of stations is transmitted simultaneously, transmit a single multi-station block acknowledgment frame to the plurality of stations, receive a respective second measurement frame from each of the plurality of stations, wherein the second measurement frame from each of the plurality of stations is transmitted simultaneously, and determine a respective distance to each of the plurality of stations based at least in part on the first measurement frame and the second measurement frame from at least some of the plurality of stations.

An example apparatus for determining distances to a plurality of stations according to the disclosure includes means for receiving a respective first measurement frame from each of the plurality of stations, wherein the first measurement frame from each of the plurality of stations is transmitted simultaneously, means for transmitting a single multi-station block acknowledgment frame to the plurality of stations, means for receiving a respective second measurement frame from each of the plurality of stations, wherein the second measurement frame from each of the plurality of stations is transmitted simultaneously, and means for determining a respective distance to each of the plurality of stations based at least in part on the first measurement frame and the second measurement frame from at least some of the plurality of stations.

An example non-transitory processor-readable storage medium comprising processor-readable instructions configured to determine distances to a plurality of stations according to the disclosure includes code for receiving a respective first measurement frame from each of the plurality of stations, wherein the first measurement frame from each of the plurality of stations is transmitted simultaneously, code for transmitting a single multi-station block acknowledgment frame to the plurality of stations, code for receiving a respective second measurement frame from each of the plurality of stations, wherein the second measurement frame from each of the plurality of stations is transmitted simultaneously, and code for determining a respective distance to each of the plurality of stations based at least in part on the first measurement frame and the second measurement frame from at least some of the plurality of stations.

Items and/or techniques described herein may provide one or more of the following capabilities, as well as other capabilities not mentioned. Stations in a wireless network may be configured to utilize orthogonal frequency-division multiple access (OFDMA) procedures. An initiating station may send a measurement request to a plurality of responding stations. The measurement request may include an indication of a resource unit in the OFDMA procedures to each of the responding stations. The responding stations may simultaneously send measurement frames based on the indication of the resource unit. The initiating station may provide a single multi-station block acknowledgment frame to the responding stations. The round trip times for the measurement frames may be computed. The locations of the responding stations may be determined. The simultaneous transmission of measurement frames may reduce latency in the location determinations. Other capabilities may be pro-

DETAILED DESCRIPTION

Techniques are discussed herein for obtaining round trip timing (RTT) measurements using orthogonal frequency-division multiple access procedures. Many wireless protocols include capabilities for determining a range between stations based on RTT procedures. For example, the IEEE 802.11 REVmc standard provides methods for two devices to exchange Fine Timing Measurement (FTM) frames to measure the round trip time between the two devices which can be used to estimate the range between the two devices. In general, multiple RTT measurements may be required to average out noise and detect measurement outliers, which may increase the time required to estimate a range between the stations. In operation, a device with an unknown location may need to perform RTT/range measurements with three other devices with known locations and perform triangulation processes to calculate a location, which may also increase the time needed for location estimation. The techniques provided herein utilize OFDMA transmissions (such as supported in IEEE 802.11ax) to obtain RTT measurements from multiple stations simultaneously, which may reduce the time required for range and location estimation. For example, transmitting frames simultaneously may reduce the latency and enable near real time location determination. These techniques and configurations are examples, and other techniques and configurations may be used. For example, other RTT procedures and other radio access technologies may be used.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
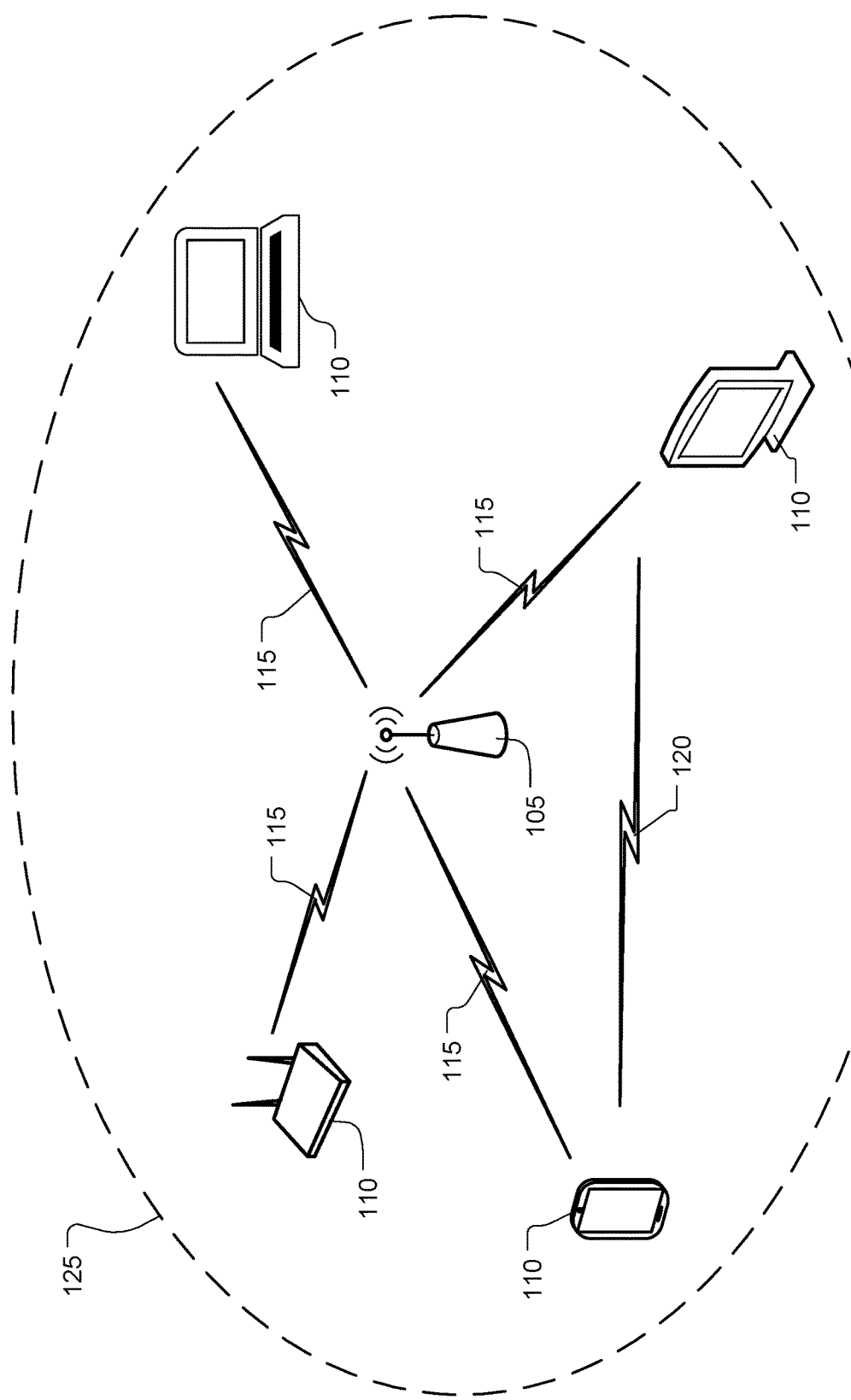
FIG. 1 is a block diagram of an example wide local area network (WLAN).

Referring first to FIG. 1, a block diagram illustrates an example of a WLAN network 100 such as, e.g., a network implementing at least one of the IEEE 802.11 family of standards. The WLAN network 100 may include an access point (AP) 105 and one or more wireless devices 110 or stations (STAs), such as mobile stations, personal digital assistants (PDAs), other handheld devices, netbooks, notebook computers, tablet computers, laptops, display devices (e.g., TVs, computer monitors, etc.), printers, IoT devices, etc. While one AP 105 is illustrated, the WLAN network 100 may have multiple APs 105. Each of the wireless devices 110, which may also be referred to as mobile stations (MSs), mobile devices, access terminals (ATs), user equipment (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile. The principles of the present disclosure are described in the context of Wi-Fi wireless systems for the purpose of illustration. Nevertheless, it will be understood that these principles are not necessarily limited to Wi-Fi systems, and can also be implemented in devices and systems configured to communicate over other radio access technologies such as cellular networks (e.g., LTE, 5G-NR).

A wireless device 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) is used to connect APs 105 in an extended service set. A geographic coverage area 125 for an access point 105 may be divided into sectors making up a portion of the coverage area. The WLAN network 100 may include access points 105 of different types (e.g., metropolitan area, home network, etc.), with varying sizes of coverage areas and overlapping coverage areas for different technologies. In other examples, other wireless devices can communicate with the AP 105.

While the wireless devices 110 may communicate with each other through the AP 105 using communication links 115, each wireless device 110 may also communicate directly with one or more other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include Wi-Fi Direct connections, connections established by using a Wi-Fi Tunneled Direct Link Setup (TDLS) link, 5G-NR sidelink, PC5, and other D2D and/or P2P group connections. The wireless devices 110 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, 802.11ax and the like. In other implementations, other peer-to-peer connections and/or ad hoc networks may be implemented within the WLAN network 100.

Figure 2:
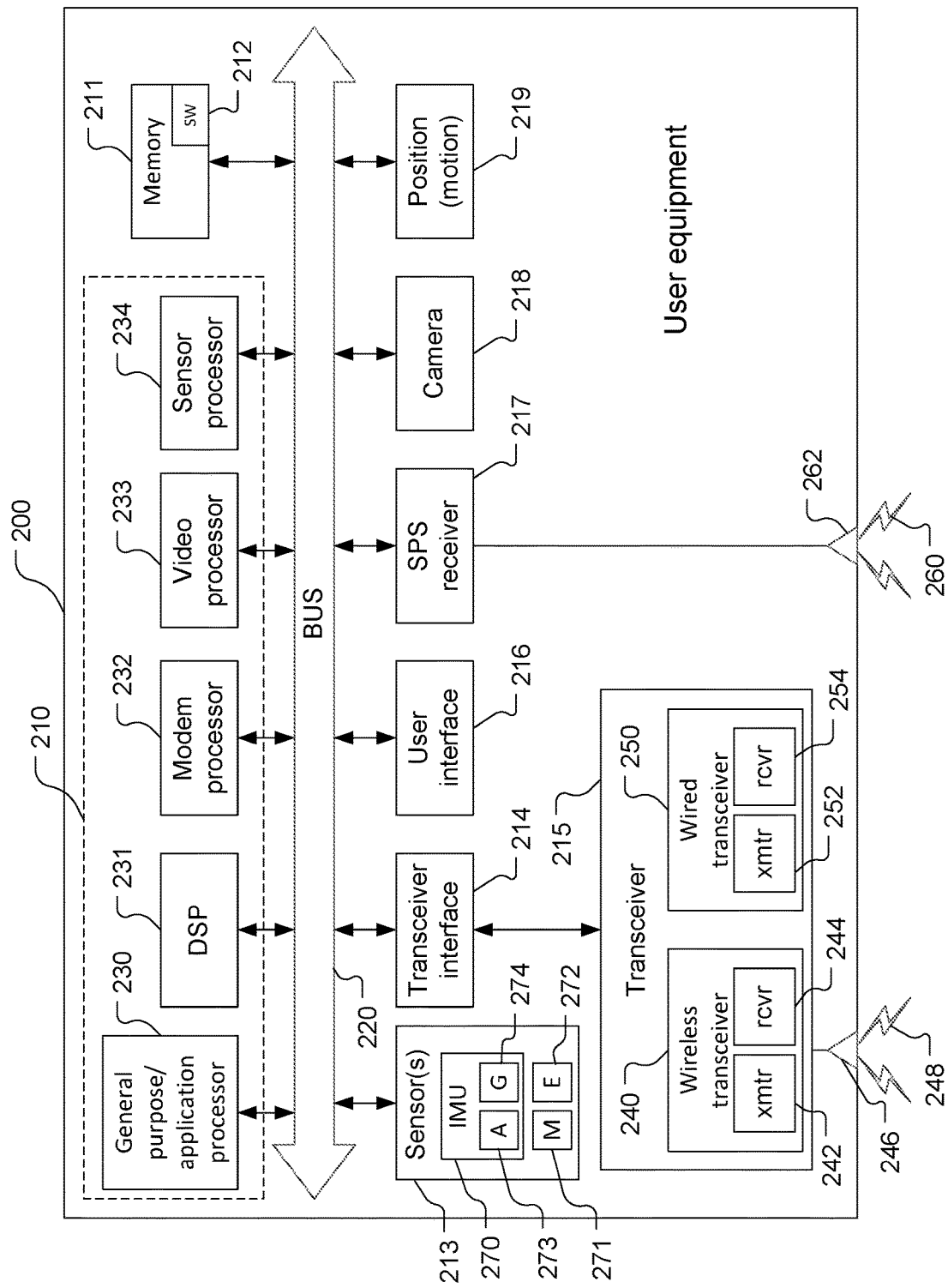
FIG. 2 is a block diagram of components of an example wireless device.

Referring also to FIG. 2, a UE 200 is an example of a wireless devices 110 and may comprise a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200 or other wireless devices 110. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250. Other configurations may not include all of the components of the UE 200. For example, an IoT device may include one or more wireless transceivers 240, the memory 211 and a processor 230.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile. In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting and/or receiving wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with access points and/or one or more other devices) according to a variety of radio access technologies (RATs) such as IEEE 802.11 (including IEEE 802.11ax), WiFi, WiFi Direct (WiFi-D), Bluetooth®, Zigbee etc. The wired transceiver 250 may include a transmitter 252 and a receiver 254 configured for wired communication. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
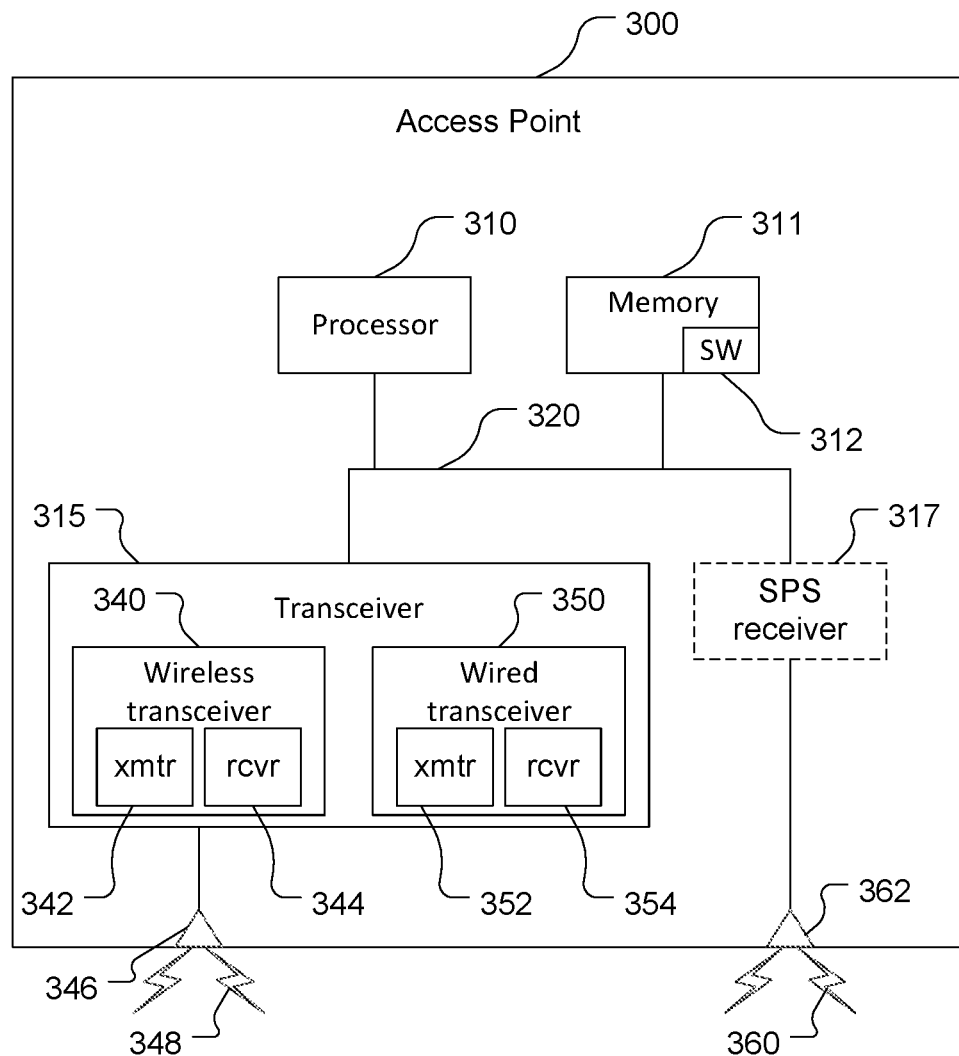
FIG. 3 is a block diagram of components of an example access point.

Referring also to FIG. 3, an example of an access point (AP) 300 such as the AP 105 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the AP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as IEEE 802.11 (including IEEE 802.11ax), WiFi, WiFi Direct (WiFi-D), Bluetooth®, Zigbee etc. The wired transceiver 350 may include a transmitter 352 and a receiver 354 configured for wired communication. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

Figure 4:
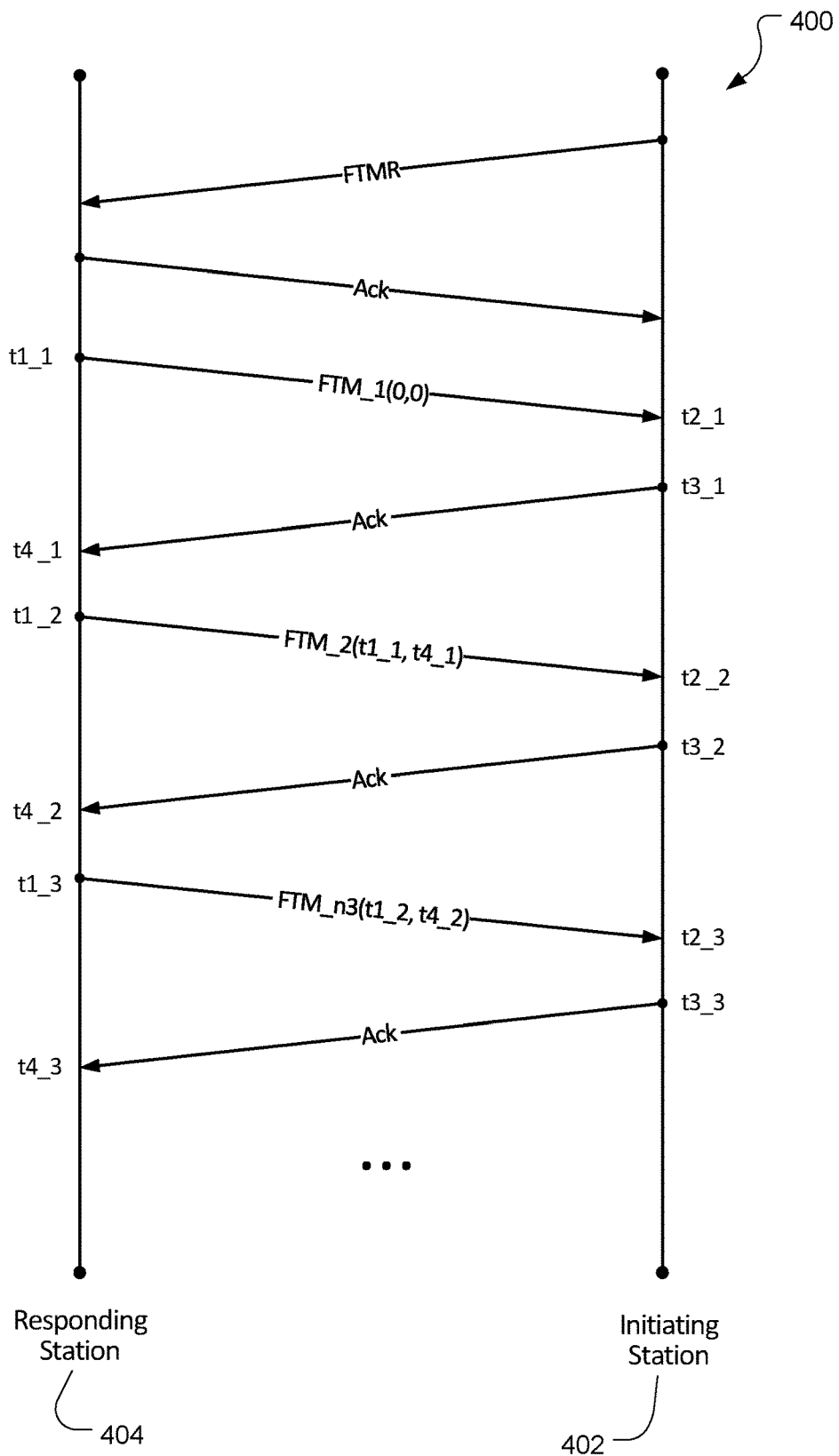
FIG. 4 is an example message flow for a round trip time measurement session.

Referring to FIG. 4, an example conceptual diagram of a round trip time measurement session 400 is shown. The general approach includes an initiating station 402 and a responding station 404. The initiating station 402 and the responding station 404 may be a UE such as the UE 200, an AP such as the AP 300, or other wireless mobile devices configured to participate in time-of-flight based positioning. In an example, and not a limitation, the RTT measurement session 400 may be based on Fine Timing Measurement messages exchanged between the initiating and responding stations 402, 404. Other messages and signals such as positioning reference signals (PRS), sounding reference signals (SRS), or other reference signals may be used to determine time-of-flight information between two stations. The RTT session 400 may utilize a FTM Protocol (e.g., 802.11mc D4.3 section 10.24.6) to enable two stations to exchange round trip measurement frames (e.g., FTM frames). The initiating station 402 may transmit a Fine Timing Measurement request (FTMR) to the responding station 404. The responding station 404 may send an acknowledgment frame (ACK) and then send an initial FTM frame (i.e., FTM_1). The initiating station 402 may compute the round trip time by recording the TOA (i.e., t2) of the FTM frame from the responding station 404 and recording the TOD of an acknowledgement frame (ACK) of the FTM frame (i.e., t3). The responding station 404 may record the TOD of the FTM frame (i.e., t1) and the TOA of the ACK received from initiating station 402 (i.e., t4). Variations of message formats may enable the timing values to be transferred between the initiating and responding stations 402, 404. The RTT is thus computed as:

$$\text{RTT}=[(t4-t1)-(t3-t2)] \quad (1)$$

The RTT session 400 may allow the initiating station 402 to obtain its range with the responding station 404. An FTM session is an example of a ranging technique between the initiating station 402 and the responding station 404. Other ranging techniques such as TDOA, TOA/TOF may also be used to determine the relative positions of the two stations. Beamforming technologies and the associated Angle of Arrival (AoA) and/or Angle of Departure (AoD) measurements may also be used in the positioning calculations. Other signaling may also be used to enable a negotiation process, the measurement exchange(s), and a termination process.

Figure 5:
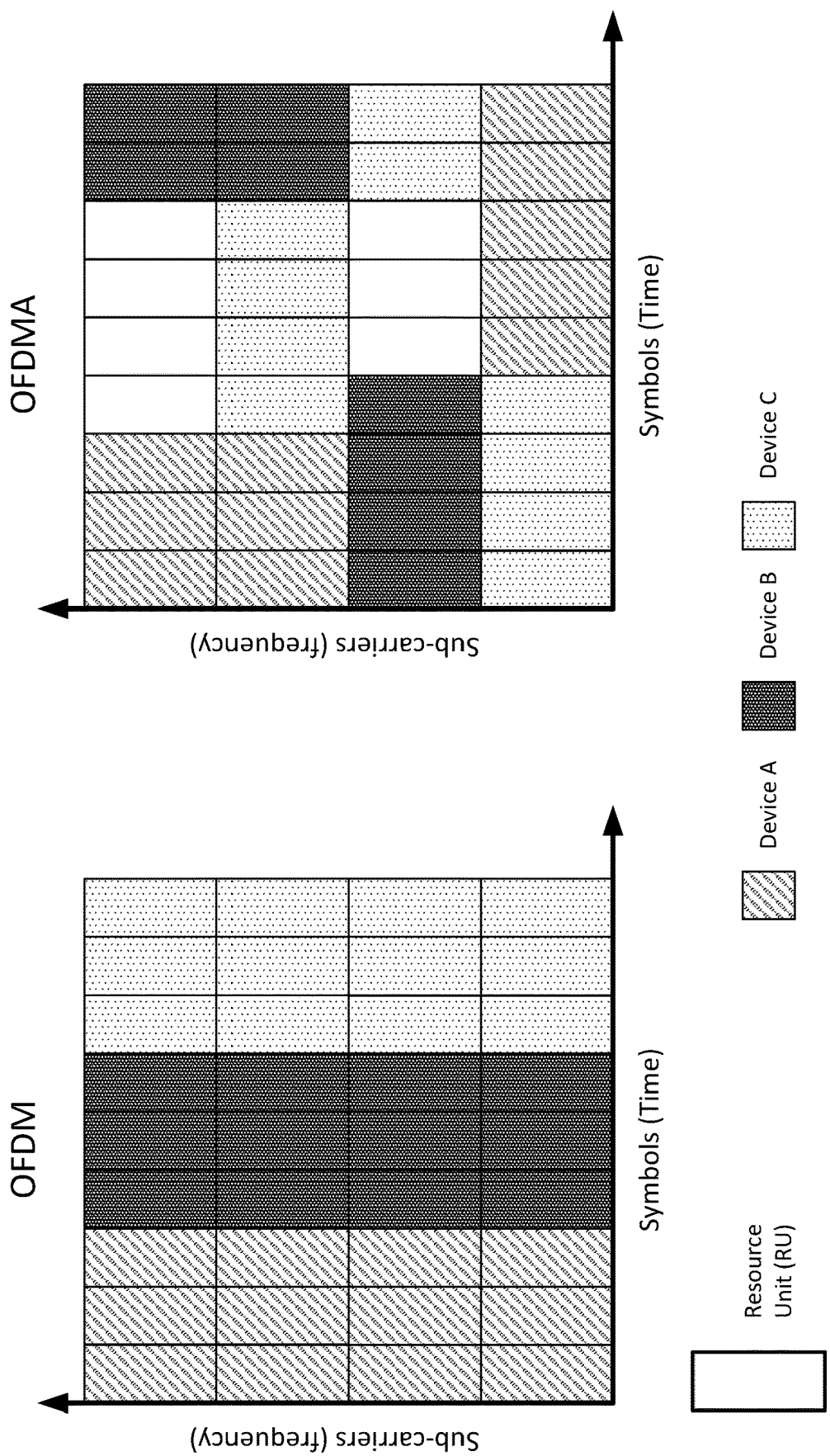
FIG. 5 includes conceptual diagrams of symbols in orthogonal frequency-division multiplexing and orthogonal frequency-division multiple access signals.

Referring to FIG. 5, conceptual diagrams of symbols in orthogonal frequency-division multiplexing (OFDM) and orthogonal frequency-division multiple access (OFDMA) signals are shown. In general, both OFDM and OFDMA are wideband digital communication technologies based on the concept of bundling evenly spaced multiple sub-carriers with special characteristics into chunks and transmitting them separately. OFDM may be based on a Frequency Division Multiplexing (FDM) mechanism configure to divide a single wideband signal into a large set of narrow-band sub-carriers such that the sub-carriers are orthogonal to each other and evenly spaced. Thus, OFDM may be utilized to divide one high-speed signal into numerous slow signals to be more robust at the receiver's end so that the sub-channels can then transmit data without being subject to the same intensity of multipath distortion faced by single carrier transmission. The numerous sub-carriers may then be collected at the receiver and recombined to form one high-speed transmission. The orthogonally of subcarriers may provide high Spectral efficiency and low Inter-Carrier-Interference (ICI). In OFDM systems, a single device (e.g., user) may transmit on all of the sub-carriers at a given time. In an example, an OFDM system may utilize Time Division Multiple Access (TDMA) (i.e., separate time frames) or Frequency Division Multiple Access (FDMA) (i.e., separate channels) to accommodate multiple devices.

OFDMA is a multi-user OFDM technology where devices can be assigned on both a TDMA and a FDMA basis. For example, as depicted in FIG. 5, a single device (e.g., Device A, Device B, or Device C) may not necessarily need to occupy all the sub-carriers at any given time. A subset of subcarriers (e.g., Resource Units (RU)) may be assigned to a particular device. This may allow simultaneous low data rate transmission from several devices. In an example, an RU may include a minimum of 20 tones (e.g., approximately 2 MHz) and a maximum of 996 tones (e.g., approximately 80 MHz). Other RU bandwidths may also be used. Other point-to-multipoint fixed and mobile systems and protocols may use OFDMA such as, for example, IEEE 802.11ax, LTE, and 5G-NR. The Wi-Fi FTM exchanges described herein are examples, and not a limitation as other RTT protocols (e.g., PRS, SRS, sidelinks) in other wireless and radio access technologies (e.g., LTE, 5G-NR) may also utilize OFDMA based RTT procedures.

Figure 6:
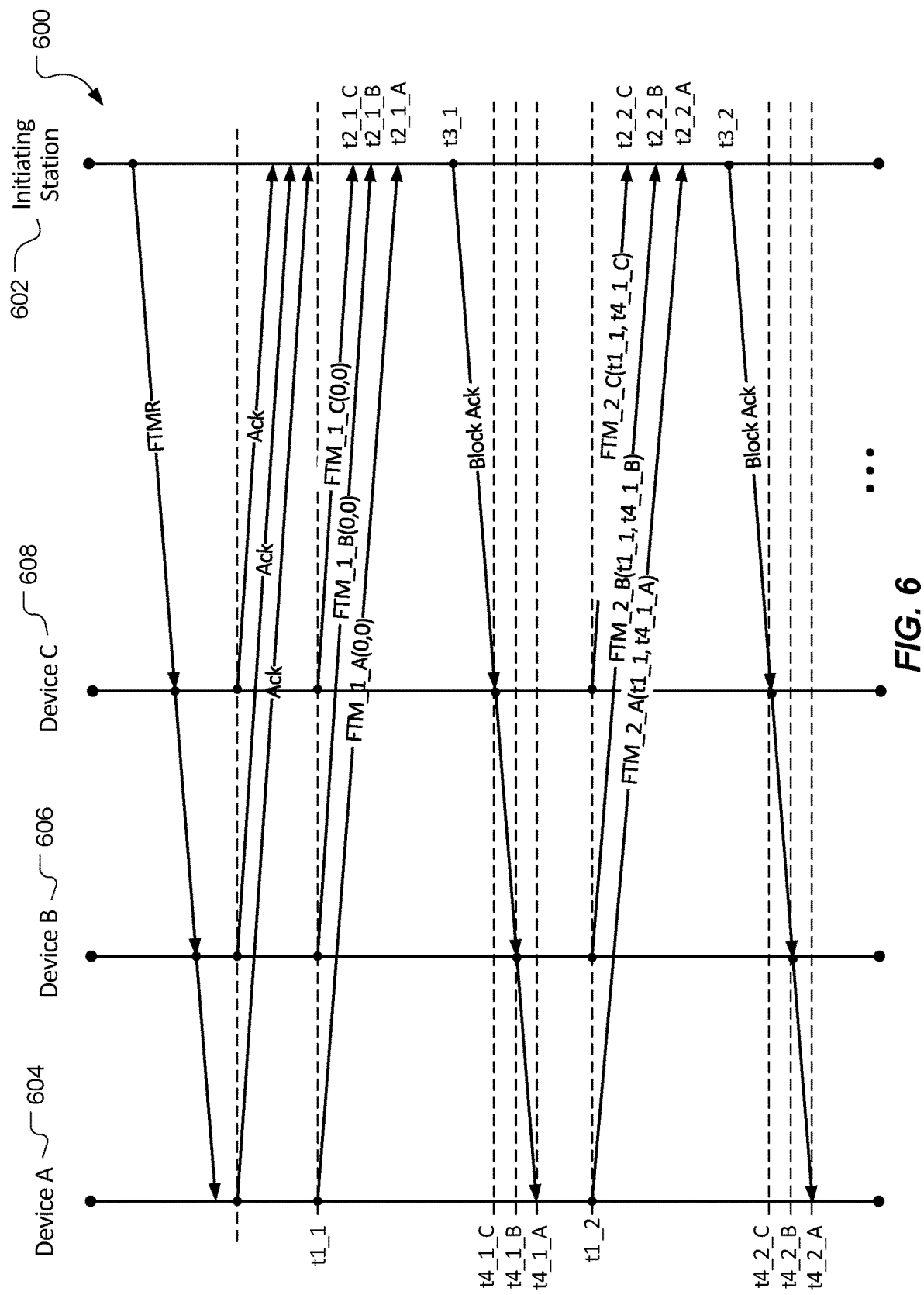
FIG. 6. is an example message flow for a round trip time measurement session with orthogonal frequency-division multiple access signals.

Referring to FIG. 6, an example message flow 600 for a RTT measurement session with OFDMA signals is shown. The message flow 600 includes an initiating station 602 and three responding stations: device A 604, device B 606 and device C 608. The initiation station 602 and the responding stations 604, 606, 608 may be combinations of wireless devices such as the AP 300 and the UE 200. The message flow 600 depicts FTM exchanges between the stations as an example and not a limitation. Other RTT procedures may also be used. In an example, the initiating station 602 may transmit a FTMR message including a trigger frame with an indication of a RU for each responding station 604, 606, 608 to send FTM frames. The devices 604, 606, 608 may send respective acknowledgement (ACK) frames. The responding stations 604, 606, 608 are configured to send OFDMA FTM frames in their respective RUs simultaneously. For example, each of the responding stations 604, 606, 608 may send an initial FTM frame at time t1_1 (i.e., FTM_1_A, FTM_1_B, FTM_1_C). The initiating station 602 receives the initial FTM frames at the respective t2 times (i.e., t2_1_A, t2_1_B, t2_1_C), and is configured to send single multi-station (i.e., Block Ack) at time t3_1 which may be received by each of the responding stations 604, 606, 608 at the respective t4 times (i.e., t4_1_A, t4_1_B, t4_1_C). In an example, the multi-station Block Ack may be based on the format described in 802.11ax, sec. 9.3.1.8.7. The responding stations 604, 606, 608 may send subsequent simultaneous FTM frames (i.e., FTM_2_A, FTM_2_B, FTM_2_C) at time t1_2. The initiating station 602 receives the subsequent FTM frames and provides another single Block Ack at time t3_2. The FTM exchanges depicted in the message flow 600 may continue for additional iterations (e.g., 3, 4, 5, 6, 7 etc. FTMs/Block Acks) and the average RTT times may be utilized to estimate the distance between the stations. The initiating station 602 may utilize the equation (1) and the respective t1, t2, t3, t4 to estimate the RTT between the respective responding stations 604, 606, 608 and the initiating station 602.

Figure 7:
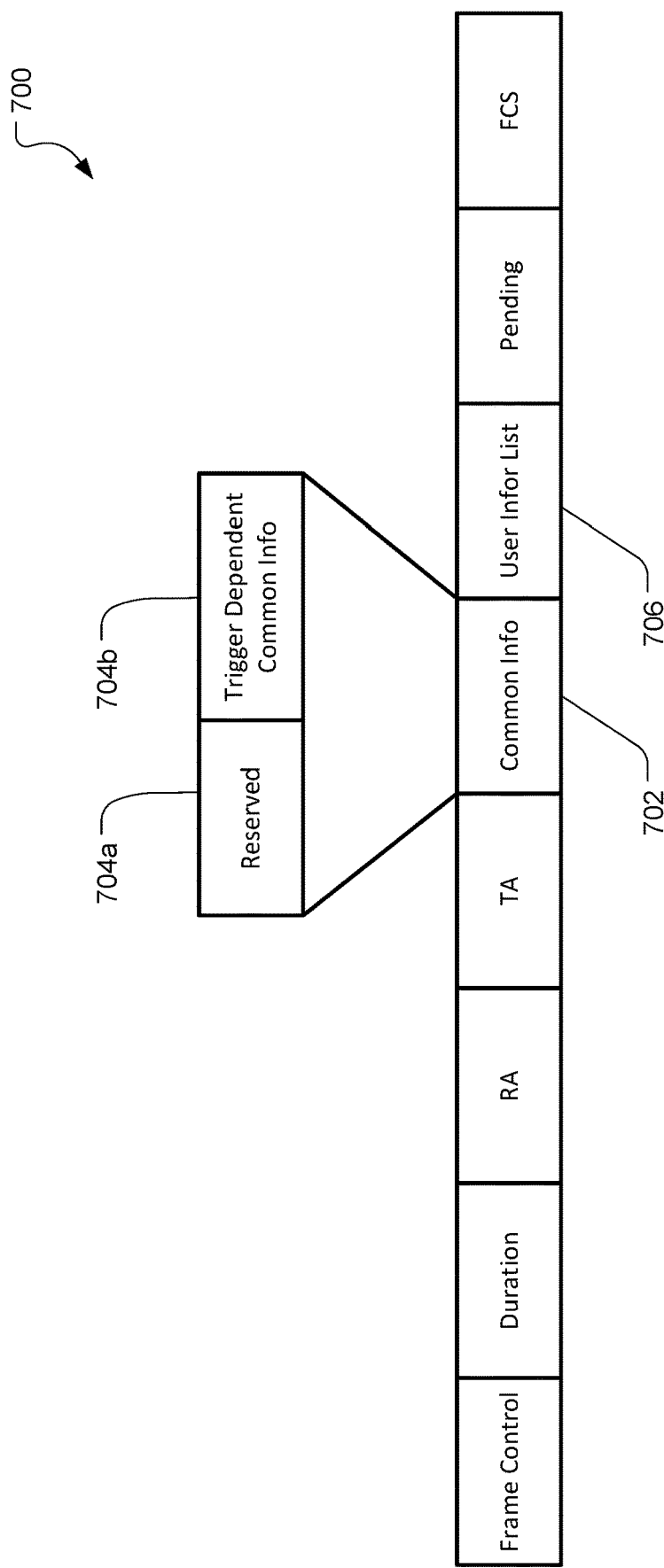
FIG. 7 is an example trigger frame format for a fine timing measurement request.

Referring to FIG. 7, an example trigger frame format 700 for a fine timing measurement request (FTMR) is shown. The trigger frame format 700 may be include in a FTMR and may include a common information element 702 including a reserve element 704a and the trigger dependent common information element 704b. In an example, the reserve element 704a may be a single bit and may be used as a flag to indicate to responding stations that the initiating station is capable of RTT using OFDMA. For example, the FTMR in the message flow 600 may be configured to provide an indication of the capability of the initiating station 602 (i.e., using the reserve element 704a) and an indication of the RU to each device in the triggered frame. The reserve element 704a and the flag value are examples and not a limitation as other signaling techniques may be used to provide an indication of the capabilities of the initiating station. The user information list element 706 may be configured to provide details on each client device participating in an upcoming OFDMA transmission. For example, the user information list element 706 may include address information elements (i.e., AID) and an RU allocation element (i.e., RU Allocation) to indicate the size and location of the resource unit allocated for the addressed stations.

Figure 8:
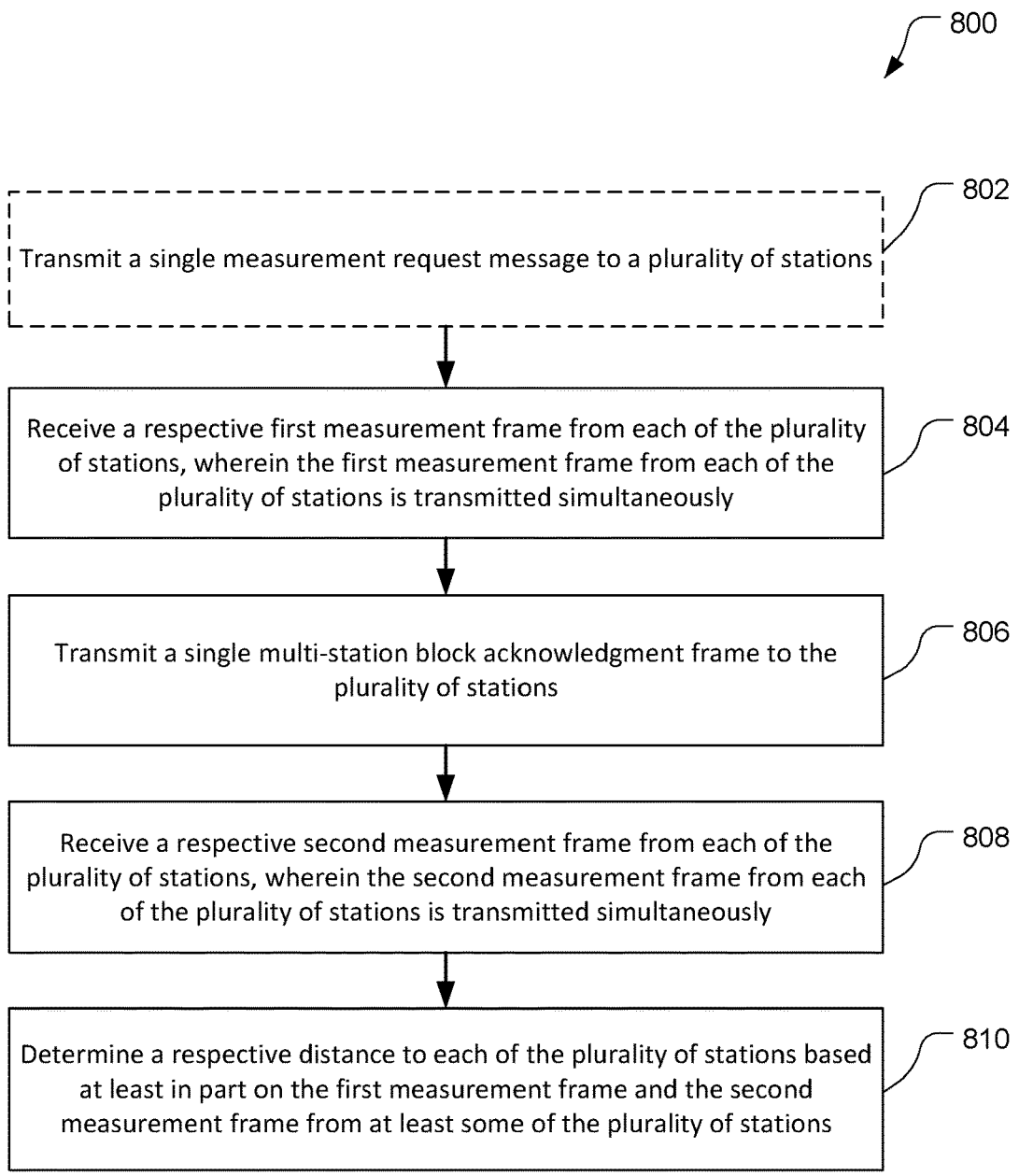
FIG. 8 is an example process flow performed by an initiating station for determining distances to a plurality of stations using orthogonal frequency-division multiple access signals.

Referring to FIG. 8, with further reference to FIGS. 1-7, a method 800 performed by an initiating station for determining distances to a plurality of stations using orthogonal frequency-division multiple access signals includes the stages shown. The method 800 is, however, an example and not limiting. The method 800 may be altered, e.g., by having stages added, removed, rearranged, combined, performed concurrently, and/or having single stages split into multiple stages.

At stage 802, the method optionally includes transmitting a single measurement request message to a plurality of stations. An AP 300 is a means for transmitting a single measurement message. The measurement request message may be based on RTT procedures such as a fine timing measurement exchange. In an example, referring to the message flow 600, the initiating station 602 may transmit the FTMR to one or more responding stations 604, 606, 608. The FTMR includes a trigger frame, which includes an indication of the RU allocation for each responding station. For example, the RU allocation element in the user info field (i.e., 802.11ax, FIG. 9-64d) may indicate the size and location of the RU allocation for the addressed station. In an example, the FTMR may include the trigger frame format 700 and utilize the reserve element 704a to provide an indication of the capabilities of the initiating station 602.

At stage 804, the method includes receiving a respective first measurement frame from each of the plurality of stations, wherein the first measurement frame from each of the plurality of stations is transmitted simultaneously. An AP 300, including the transceiver 315 and the processor 310, may be a means for receiving the first measurement frame from each of the plurality of stations. The first measurement frame may be based on an RTT procedure such as FTM. Referring to the message flow 600, the responding stations 604, 606, 608 may simultaneously transmit fine timing measurement frames in their respective RU. For example, the respective first FTM frames may include device A 604 sending FTM_1_A, device B 606 sending FTM_1_B, and device C 608 sending FTM_1_C at time 0_1. The respective first FTM frames may be received by the initiating station 602 at the respective t2_1 times (e.g., t2_1_A, t2_1_B, t2_1_C).

At stage 806, the method includes transmitting a single multi-station block acknowledgment frame to the plurality of stations. The AP 300, including the transceiver 315 and the processor 310, may be a means for transmitting the single multi-station BlockAck. For example, a Multi-Station BlockAck may include multiple receiver addresses (RAs) such as the addresses associated with the responding stations 604, 606, 608. Referring to FIG. 6, the BlockAck may be transmitted by the initiating station 602 at time t3_1 and received by the responding stations 604, 606, 608 at the respective t4 times (i.e., t4_1_A, t4_1_B, t4_1_C).

At stage 808 the method includes receiving a respective second measurement frame from each of the plurality of stations, wherein the second measurement frame from each of the plurality of stations is transmitted simultaneously. The AP 300, including the transceiver 315 and the processor 310, may be a means for receiving the respective second measurement frames. The second measurement frames may be based on the RTT procedure of stage 804, such as FTM. Referring to the message flow 600, the responding stations 604, 606, 608 may simultaneously transmit the second fine timing measurement frames. For example, the respective seconds FTM frames may include device A 604 sending FTM_2_A, device B 606 sending FTM_2_B, and device C 608 sending FTM_2_C at time t1_2. The respective second FTM frames may be received by the initiating station 602 at the respective t2_2 times (e.g., t2_2_A, t2_2_B, t2_2_C). The initiating station 602 may send a second multi-station BlockAck message at time t3_2 to the responding stations 604, 606, 608. The method 800 may include additional RTT message exchanges between the initiating and responding stations.

At stage 810, the method includes determining a respective distance to each of the plurality of stations based at least in part on the first measurement frame and the second measurement frame from at least some of the plurality of stations. The AP 300, the processor 310, may be a means for determining the respective distances. In an example, the AP 300 is configured to use the respective RTT times (i.e., based on equation (1)) and the speed of light to determine the distances to the respective responding stations. Other constants and bias factors may also be used in the distance computations. In an embodiment, the RTT and/or distance information may be provided to the respective responding stations 604, 606, 608 and/or other network entities (e.g., a location server).

In an embodiment, the first measurement frame, the single multi-station block acknowledgment frame, and the second measurement frame utilize a sidelink wireless communication protocol. For example, the transceiver 315 and the processor 310, may be a means for transmitting and receiving sidelink signals via a D2D interface such as PC5. Other D2D interfaces and protocols may also be used.

Figure 9:
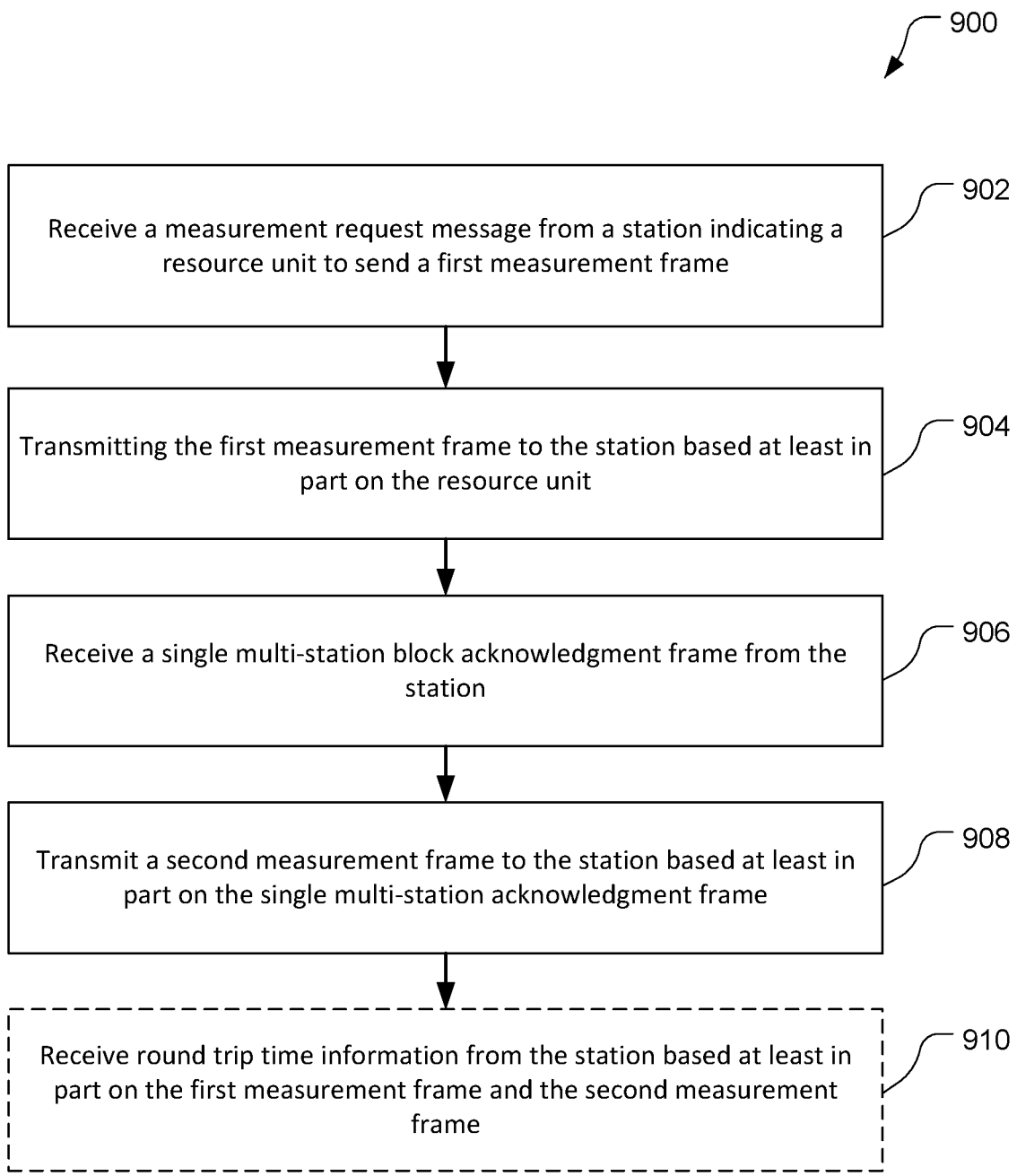
FIG. 9 is an example process flow performed by a responding station for determining a distance to a station using orthogonal frequency-division multiple access signals.

Referring to FIG. 9, with further reference to FIGS. 1-7, a method 900 performed by a responding station for determining a distance to a station using orthogonal frequency-division multiple access signals includes the stages shown. The method 900 is, however, an example and not limiting. The method 900 may be altered, e.g., by having stages added, removed, rearranged, combined, performed concurrently, and/or having single stages split into multiple stages.

At stage 902, the method includes receiving a measurement request message from a station indicating a resource unit to send a first measurement frame. The UE 200, including the transceiver 215 and the processor 230, may be a means for receiving a measurement request message. The measurement request message may be based on a RTT procedure, such as FTM exchanges. In an example, referring to the message flow 600, the initiating station 602 may transmit the FTMR indicating a resource unit to send a first fine timing measurement frame. For example, the FTMR includes a trigger frame, which includes an indication of the RU allocation for sending FTM messages. For example, the RU allocation element in the user info field (i.e., 802.11ax, FIG. 9-64d) may indicate the size and location of the RU allocation for an addressed station. In an example, the FTMR may include the trigger frame format 700 and utilize the reserve element 704a to provide an indication of the capabilities of the initiating station 602.

At stage 904, the method includes transmitting the first measurement frame to the station based at least in part on the resource unit. The UE 200, including the transceiver 215 and the processor 230, may be a means for transmitting the first measurement frame. Referring to the message flow 600, a responding station such as the device A 604 may transmit FTM frame (i.e., FTM_1_A) based on the RU indicated in the FTMR at time t1_1. The device B 606 and the device C 608 may also send a first FTM frame based on the RU indicated in the FTMR. The respective first FTM frames may be received by the initiating station 602 at the respective t2_1 times (e.g., t2_1_A, t2_1_B, t2_1_C).

At stage 906, the method includes receiving a single multi-station block acknowledgment frame from the station. The UE 200, including the transceiver 215 and the processor 230, may be a means for receiving the single multi-station BlockAck. The Multi-Station BlockAck may include receiver address (RA) information including the address associated with the responding stations such as the device A 604. Referring to FIG. 6, the BlockAck may be transmitted by the initiating station 602 at time t3_1 and received by the responding stations 604, 606, 608 at the respective t4 times (i.e., t4_1_A, t4_1_B, t4_1_C).

At stage 908 the method includes transmitting a second measurement frame to the station based at least in part on the single multi-station acknowledgment frame. The UE 200, including the transceiver 215 and the processor 230, may be a means for transmitting the second measurement frame. Referring to the message flow 600, the responding stations such as the device A 604 may transmit the second fine timing measurement frame at time t1_2. The device B 606 and the device C 608 may also simultaneously send respective second FTM frames. The respective second FTM frames may be received by the initiating station 602 at the respective t2_2 times (e.g., t2_2_A, t2_2_B, t2_2_C). The initiating station 602 may send a second multi-station BlockAck message at time t3_2 to the responding stations 604, 606, 608. The method 900 may include additional FTM exchanges between the initiating and responding stations.

At stage 910, the method optionally includes receiving round trip time information from the station based at least in part on the first measurement frame and the second measurement frame. The UE 200, including the transceiver 215 and the processor 230, may be a means for receiving RTT information. In an example, the AP 300 is configured to determine the RTT (i.e., based on equation (1)) and provide the computed RTT to the responding stations or other network resources. The responding stations 604, 606, 608 may utilize the RTT to determine the range to the initiating station. The range information may be used by the stations or other network entities for determining the locations of the UEs.

The RTT using OFDMA procedures described herein may be used with other wireless technologies such as LTE and 5G-NR. The roles of initiating and responding stations may be interchangeably performed by base stations, access points, and UEs. The OFDMA procedures may be used in uplink, downlink and sidelink channels.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for determining distances to a plurality of stations, comprising:

receiving a respective first measurement frame from each of the plurality of stations, wherein the first measurement frame from each of the plurality of stations is transmitted simultaneously;

transmitting a single multi-station block acknowledgment frame to the plurality of stations;

receiving a respective second measurement frame from each of the plurality of stations, wherein the second measurement frame from each of the plurality of stations is transmitted simultaneously; and determining a respective distance to each of the plurality of stations based at least in part on the first measurement frame and the second measurement frame from at least some of the plurality of stations.

2. The method of clause 1 wherein the first measurement frame and the second measurement frame are fine timing measurement frames.

3. The method of clause 1 wherein the first measurement frame and the second measurement frame are encoded with an orthogonal frequency-division multiple access procedure.

4. The method of clause 1 wherein the single multi-station block acknowledgment frame includes a plurality of receiver addresses associated with the plurality of stations.

5. The method of clause 1 further comprising transmitting a single measurement request message to the plurality of stations prior to receiving the first measurement frame.

6. The method of clause 5 wherein the single measurement request message includes an indication of a resource unit for each of the plurality of stations to transmit the first measurement frame.

7. The method of clause 5 wherein the single measurement request message includes an indication of a capability of an initiating station to receive measurement frames from the plurality of stations based on an orthogonal frequency-division multiple access procedure.

8. The method of clause 1 wherein the plurality of stations include at least one user equipment.

9. The method of clause 1 wherein the plurality of stations include at least one access point.

10. The method of clause 1 wherein the first measurement frame, the single multi-station block acknowledgment frame, and the second measurement frame utilize a sidelink wireless communication protocol.

11. An apparatus, comprising:
a memory;
at least one transceiver;
at least one processor communicatively coupled to the memory and the at least one transceiver and configured to:

receive a respective first measurement frame from each of a plurality of stations, wherein the first measurement frame from each of the plurality of stations is transmitted simultaneously;

transmit a single multi-station block acknowledgment frame to the plurality of stations;

receive a respective second measurement frame from each of the plurality of stations, wherein the second measurement frame from each of the plurality of stations is transmitted simultaneously; and determine a respective distance to each of the plurality of stations based at least in part on the first measurement frame and the second measurement frame from at least some of the plurality of stations.

12. The apparatus of clause 11 wherein the first measurement frame and the second measurement frame are fine timing measurement frames.

13. The apparatus of clause 11 wherein the first measurement frame and the second measurement frame are encoded with an orthogonal frequency-division multiple access procedure.

14. The apparatus of clause 11 wherein the single multi-station block acknowledgment frame includes a plurality of receiver addresses associated with the plurality of stations.

15. The apparatus of clause 11 wherein the at least one processor is further configured to transmit a single measurement request message to the plurality of stations prior to receiving the first measurement frame.

16. The apparatus of clause 15 wherein the single measurement request message includes an indication of a resource unit for each of the plurality of stations to transmit the first measurement frame.

17. The apparatus of clause 15 wherein the single measurement request message includes an indication of a capability of an initiating station to receive measurement frames from the plurality of stations based on an orthogonal frequency-division multiple access procedure.

18. The apparatus of clause 11 wherein the plurality of stations include at least one user equipment.

19. The apparatus of clause 11 wherein the plurality of stations include at least one access point.

20. The apparatus of clause 11 wherein the at least one transceiver is configured to transmit and receive via a sidelink wireless communication protocol, and the first measurement frame, the single multi-station block acknowledgment frame, and the second measurement frame utilize the sidelink wireless communication protocol.

21. An apparatus for determining distances to a plurality of stations, comprising:

means for receiving a respective first measurement frame from each of the plurality of stations, wherein the first measurement frame from each of the plurality of stations is transmitted simultaneously;

means for transmitting a single multi-station block acknowledgment frame to the plurality of stations;

means for receiving a respective second measurement frame from each of the plurality of stations, wherein the second measurement frame from each of the plurality of stations is transmitted simultaneously; and means for determining a respective distance to each of the plurality of stations based at least in part on the first measurement frame and the second measurement frame from at least some of the plurality of stations.

22. The apparatus of clause 21 wherein the first measurement frame and the second measurement frame are fine timing measurement frames or are encoded with an orthogonal frequency-division multiple access procedure.

23. The apparatus of clause 21 wherein the single multi-station block acknowledgment frame includes a plurality of receiver addresses associated with the plurality of stations.

24. The apparatus of clause 21 further comprising means for transmitting a single measurement request message to the plurality of stations prior to receiving the first measurement frame, wherein the single measurement request message includes an indication of a resource unit for each of the plurality of stations to transmit the first measurement frame.

25. The apparatus of clause 21 further comprising means for transmitting and receiving signals via a sidelink wireless communication protocol, wherein the first measurement frame, the single multi-station block acknowledgment frame, and the second measurement frame utilize the sidelink wireless communication protocol.

26. A non-transitory processor-readable storage medium comprising processor-readable instructions configured to determine distances to a plurality of stations, comprising:

code for receiving a respective first measurement frame from each of the plurality of stations, wherein the first measurement frame from each of the plurality of stations is transmitted simultaneously;

code for transmitting a single multi-station block acknowledgment frame to the plurality of stations;

code for receiving a respective second measurement frame from each of the plurality of stations, wherein the second measurement frame from each of the plurality of stations is transmitted simultaneously; and code for determining a respective distance to each of the plurality of stations based at least in part on the first measurement frame and the second measurement frame from at least some of the plurality of stations.

27. The non-transitory processor-readable storage medium of clause 26 wherein the first measurement frame and the second measurement frame are fine timing measurement frames or are encoded with an orthogonal frequency-division multiple access procedure.

28. The non-transitory processor-readable storage medium of clause 26 wherein the single multi-station block acknowledgment frame includes a plurality of receiver addresses associated with the plurality of stations.

29. The non-transitory processor-readable storage medium of clause 26 further comprising code for transmitting a single measurement request message to the plurality of stations prior to receiving the first measurement frame, wherein the single measurement request message includes an indication of a capability of an initiating station to receive measurement frames from the plurality of stations based on an orthogonal frequency-division multiple access procedure.

30. The non-transitory processor-readable storage medium of clause 26 further comprising code for transmitting and receiving signals via a sidelink wireless communication protocol, wherein the first measurement frame, the single multi-station block acknowledgment frame, and the second measurement frame utilize the sidelink wireless communication protocol.

The invention claimed is:

1. A method for determining distances to a plurality of stations, comprising:

transmitting a single measurement request message to the plurality of stations including an indication of a resource unit for each of the plurality of stations to transmit the first measurement frame;

receiving a respective first measurement frame from each of the plurality of stations, wherein the first measurement frame from each of the plurality of stations is transmitted simultaneously and encoded with an orthogonal frequency-division multiple access procedure;

transmitting a single multi-station block acknowledgment frame to the plurality of stations;

receiving a respective second measurement frame from each of the plurality of stations, wherein the second measurement frame from each of the plurality of stations is transmitted simultaneously and encoded with the orthogonal frequency-division multiple access procedure; and determining a respective distance to each of the plurality of stations based at least in part on the first measurement frame and the second measurement frame from at least some of the plurality of stations.

2. The method of claim 1 wherein the first measurement frame and the second measurement frame are fine timing measurement frames.

3. The method of claim 1 wherein the single multi-station block acknowledgment frame includes a plurality of receiver addresses associated with the plurality of stations.

4. The method of claim 1 wherein the single measurement request message includes an indication of a capability of an initiating station to receive measurement frames from the plurality of stations based on the orthogonal frequency-division multiple access procedure.

5. The method of claim 1 wherein the plurality of stations include at least one user equipment.

6. The method of claim 1 wherein the plurality of stations include at least one access point.

7. The method of claim 1 wherein the first measurement frame, the single multi-station block acknowledgment frame, and the second measurement frame utilize a sidelink wireless communication protocol.

8. An apparatus, comprising:
a memory;
at least one transceiver;
at least one processor communicatively coupled to the memory and the at least one transceiver and configured to:
transmit a single measurement request message to a plurality of stations including an indication of a resource unit for each of the plurality of stations to transmit the first measurement frame;
receive a respective first measurement frame from each of the plurality of stations, wherein the first measurement frame from each of the plurality of stations is transmitted simultaneously and encoded with an orthogonal frequency-division multiple access procedure;
transmit a single multi-station block acknowledgment frame to the plurality of stations;
receive a respective second measurement frame from each of the plurality of stations, wherein the second measurement frame from each of the plurality of stations is transmitted simultaneously and encoded with the orthogonal frequency-division multiple access procedure; and
determine a respective distance to each of the plurality of stations based at least in part on the first measurement frame and the second measurement frame from at least some of the plurality of stations.

9. The apparatus of claim 8 wherein the first measurement frame and the second measurement frame are fine timing measurement frames.

10. The apparatus of claim 8 wherein the single multi-station block acknowledgment frame includes a plurality of receiver addresses associated with the plurality of stations.

11. The apparatus of claim 8 wherein the single measurement request message includes an indication of a capability of an initiating station to receive measurement frames from the plurality of stations based on the orthogonal frequency-division multiple access procedure.

12. The apparatus of claim 8 wherein the plurality of stations include at least one user equipment.

13. The apparatus of claim 8 wherein the plurality of stations include at least one access point.

14. The apparatus of claim 8 wherein the at least one transceiver is configured to transmit and receive via a sidelink wireless communication protocol, and the first measurement frame, the single multi-station block acknowledgment frame, and the second measurement frame utilize the sidelink wireless communication protocol.

15. An apparatus for determining distances to a plurality of stations, comprising:
means for transmitting a single measurement request message to the plurality of stations including an indication of a resource unit for each of the plurality of stations to transmit the first measurement frame;
means for receiving a respective first measurement frame from each of the plurality of stations, wherein the first measurement frame from each of the plurality of stations is transmitted simultaneously and encoded with an orthogonal frequency-division multiple access procedure;
means for transmitting a single multi-station block acknowledgment frame to the plurality of stations;
means for receiving a respective second measurement frame from each of the plurality of stations, wherein the second measurement frame from each of the plurality of stations is transmitted simultaneously and encoded with the orthogonal frequency-division multiple access procedure; and
means for determining a respective distance to each of the plurality of stations based at least in part on the first measurement frame and the second measurement frame from at least some of the plurality of stations.

16. The apparatus of claim 15 wherein the single multi-station block acknowledgment frame includes a plurality of receiver addresses associated with the plurality of stations.

17. The apparatus of claim 15 further comprising means for transmitting and receiving signals via a sidelink wireless communication protocol, wherein the first measurement frame, the single multi-station block acknowledgment frame, and the second measurement frame utilize the sidelink wireless communication protocol.

18. A non-transitory processor-readable storage medium comprising processor-readable instructions configured to determine distances to a plurality of stations, comprising:
code for transmitting a single measurement request message to the plurality of stations including an indication of a resource unit for each of the plurality of stations to transmit the first measurement frame;
code for receiving a respective first measurement frame from each of the plurality of stations, wherein the first measurement frame from each of the plurality of stations is transmitted simultaneously and encoded with an orthogonal frequency-division multiple access procedure;
code for transmitting a single multi-station block acknowledgment frame to the plurality of stations;

code for receiving a respective second measurement frame from each of the plurality of stations, wherein the second measurement frame from each of the plurality of stations is transmitted simultaneously and encoded with the orthogonal frequency-division multiple access procedure; and code for determining a respective distance to each of the plurality of stations based at least in part on the first measurement frame and the second measurement frame from at least some of the plurality of stations.

19. The non-transitory processor-readable storage medium of claim 18 wherein the single multi-station block acknowledgment frame includes a plurality of receiver addresses associated with the plurality of stations.

20. The non-transitory processor-readable storage medium of claim 18 further comprising code for transmitting and receiving signals via a sidelink wireless communication protocol, wherein the first measurement frame, the single multi-station block acknowledgment frame, and the second measurement frame utilize the sidelink wireless communication protocol.

\* \* \* \* \*